United States Patent
Moritz et al.

(10) Patent No.: US 11,507,669 B1
(45) Date of Patent: *Nov. 22, 2022

(54) CHARACTERIZING, DETECTING AND HEALING VULNERABILITIES IN COMPUTER CODE

(71) Applicant: BlueRISC, Inc., Amherst, MA (US)

(72) Inventors: Csaba Andras Moritz, Amherst, MA (US); Kristopher Carver, Chicopee, MA (US); Jeffry Gummeson, Hadley, MA (US)

(73) Assignee: BlueRISC, Inc., Amherst, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,935

(22) Filed: Jun. 27, 2016

Related U.S. Application Data (63) Continuation of application No. 14/551,508, filed on Nov. 24, 2014, now Pat. No. 9,411,964.

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01); *G06F 2221/033* (2013.01)

(58) Field of Classification Search
CPC ..... H04L 63/1433; H04L 63/20; G06F 21/55; G06F 21/54; G06F 21/577; G06F 221/033
USPC ............... 726/23, 25; 714/E11.207; 713/188
See application file for complete search history.

(56) References Cited

U.S. PATENT DOCUMENTS

| | | | |
|---|---|---|---|
| 6,609,201 B1 | 8/2003 | Folmsbee | |
| 6,970,985 B2 | 11/2005 | Moritz | |
| 7,284,274 B1 * | 10/2007 | Walls | G06F 8/70 726/25 |
| 7,493,607 B2 | 2/2009 | Moritz | |
| 7,996,671 B2 | 8/2011 | Chheda et al. | |
| 8,327,249 B2 | 12/2012 | Jorda et al. | |
| 8,600,718 B1 | 12/2013 | Stepaniants et al. | |
| 8,607,209 B2 | 12/2013 | Chheda et al. | |
| 9,411,964 B1 | 8/2016 | Moritz et al. | |
| 9,569,612 B2 | 2/2017 | Wilkerson et al. | |
| 9,754,112 B1 | 9/2017 | Moritz et al. | |
| 10,248,792 B1 | 4/2019 | Moritz et al. | |
| 2005/0114850 A1 | 5/2005 | Chheda et al. | |
| 2007/0044153 A1 | 2/2007 | Schuba et al. | |
| 2007/0074169 A1 * | 3/2007 | Chess | G06F 21/54 717/126 |

(Continued)

OTHER PUBLICATIONS

Keromytis (2007). Characterizing Self-Healing Software Systems, retrieved May 23, 2018 from https://www.cs.columbia.edu/~angelos/Papers/2007/mmm-acns-self.pdf (Year: 2007).*

(Continued)

*Primary Examiner* — Brian F Shaw
(74) *Attorney, Agent, or Firm* — Burns & Levinson LLP (57) ABSTRACT

An example process includes identifying, by one or more processing devices, a location in computer code that is subject to vulnerability, where the location corresponds to a memory access that is repeatable and that operates on a particular type of variable; and performing processes, by one or more processing devices, to heal the vulnerability. The memory access may be part of a system-to-system or a user-to-system interaction that is repeatable.

39 Claims, 6 Drawing Sheets

500

```
VPO-VPC Link Validation
Boundary Check with VPC Address
IF (VPO-VPC Link Unknown) || (Boundary Check Passes)
    Execute VPC Memory Instruction
ELSE
    Perform Predicated VPC Memory Instruction
    //VPC Instruction executes unless boundary is exceeded
```

(56) References Cited

U.S. PATENT DOCUMENTS

| | | | |
|---|---|---|---|
| 2007/0294181 | A1 | 12/2007 | Chheda et al. |
| 2008/0034355 | A1 | 2/2008 | Shen et al. |
| 2008/0126766 | A1 | 5/2008 | Chheda et al. |
| 2008/0276227 | A1 | 11/2008 | Greifeneder |
| 2009/0282480 | A1 | 11/2009 | Lee et al. |
| 2011/0126288 | A1* | 5/2011 | Schloegel ............ G06F 21/577 726/25 |
| 2011/0307689 | A1* | 12/2011 | Chung ................. G06F 9/3859 712/234 |
| 2013/0205285 | A1 | 8/2013 | Pizlo |
| 2014/0181980 | A1* | 6/2014 | Christodorescu ....... G06F 21/57 726/25 |
| 2015/0293896 | A1 | 10/2015 | Runkis et al. |
| 2015/0363598 | A1 | 12/2015 | Xu et al. |
| 2016/0224789 | A1 | 8/2016 | Feroz et al. |
| 2018/0048662 | A1 | 2/2018 | Jang et al. |

OTHER PUBLICATIONS

Rawat (Finding Buffer Overflow Inducing Loops in Binary Executables, Retrieved from https://ieeexplore.ieee.org/stamp/stamp.jsp?tp=&arnumber=6258307 2012) (Year: 2012).*

Non Final Rejection for U.S. Appl. No. 14/551,341, 7 pages (dated Nov. 2, 2016).

File History of U.S. Appl. No. 14/551,341, 201 pages (Retrieved Jul. 11, 2017).

Aho, A. V. et al., Compilers—Principles, Techniques, and Tools; Addison-Wesley, Reading, MA (1986).

Alternative to itoa( ) for converting integer to string C++?, 8 pages (Oct. 23, 2008). URL: http://stackoverflow.com/questions/228005/alternative-to-itoa-for-converting-integer-to-string-c [Retrieved Jun. 21, 2016].

Anderson, R.J. and Kuhn, M.J., Tamper Resistance—A Cautionary Note, in Proceedings of Second USENIX Workshop on Electronic Commerce (1996).

Brumley, D. et al., Sting: An End-to-End Self-Healing System for Defending against Internet Worms, 31 pages (Nov. 2005). URL: http://www.cs.berkeley.edu/~dawnsong/papers/2007%20sting-bookchapter-06.pdf [Retrieved Feb. 19, 2016].

Coppola, M., Owning the Network: Adventures in Router Rootkits, Virtual Security Research, LLC (2012).

Cui, A., and Stolfo, S., Defending Legacy Embedded Systems with Software Symbiotes, The 14th International Symposium on Recent Advances in Intrusion Detection (RAID), 358-377 (Sep. 2011).

Department of Homeland Security, Critical Infrastructure Sectors, 4 pages (2016). URL: http://www.dhs.gov/criticalinfrastructure-sectors [Retrieved Jun. 21, 2016].

Diskin, G., Binary Instrumentation for Security Professionals, Intel. Blackhat USA (2011).

Gartner, Gartner Says Internet of Things Installed Base Will Grow to 26 Billion Units by 2020 (Dec. 2013). URL: http://www.design-reuse.com/news/33491/gartner-internet-of-things.html [Retrieved Feb. 19, 2016].

Gilmont, T. et al., Hardware security for software privacy support, Electronics Letters, 35(24): 2096-2097 (Nov. 1999).

Jenei, S., Anti-Stacking Provisions Can Help Minimize Total Royalty Burden, (Mar. 2006). URL: http://www.patentbaristas.com/archives/2006/03/10/anti-stacking-provisions-can-help-minimizetotal- royalty-burden [Retrieved Feb. 19, 2016].

Jha, S., Software Security Issues in Embedded Systems, http://www.cs.wisc.edu/~jha [Retrieved Feb. 19, 2016].

Kean, T., Secure Configuration of Field-Programmable Gate Arrays, in proceedings of the 11th, International Conference on Field-Programmable Logic and Applications (2001).

Kerner, S.M., Network Equipment Market Growing to $51 Billion by 2015 (May 2011). URL: http://www.internetnews.com/infra/article.php/3933236/Network+Equipment+Market+Growing +to+51+Billion+by+2015.htm [Retrieved Feb. 19, 2016].

Kolodgy, C.J., Market Analysis: Worldwide Security and Vulnerability Management 2011-2015 Forecast and 2010 Vendor Shares, 1: 31 pages (Aug. 2013). URL: http://www.qualys.com/docs/idc_VM_forecast2012.pdf [Retrieved Feb. 19, 2016].

Kommerling, O., and Kuhn, M., Design Principles for Tamper-Resistant Smartcard Processors, USENIX Workshop on Smartcard Technology (1999).

Lie, D. et al., Architectural support for copy and tamper resistant software, in Proceedings of the 6th International Conference Architectural Support for Programming Languages and Operating Systems (2000).

Messerges, T.S. et al., Examining Smart Card Security under the threat of Power Analysis, IEEE Transactions on Computers (2002).

MTC Group Ltd., Morpher-Crypt the Script, 3 pages (May 14, 2010). URL: http://morpher.com [Retrieved Jun. 21, 2016].

Open Wrt Attitude Adjustment Router Firmware, 3 pages (2016). URL: https://dev.openwrt.org/log/branches/attitude_adjustment [Retrieved Feb. 19, 2016].

Pranith, D.K. et al., Hybrid Analysis of Executables to Detect Security Vulnerabilities, in Proceedings of the 2nd India Software Engineering Conference, 141-142 (2009).

Reeves, J. Autoscopy Jr., Intrusion Detection for Embedded Control Systems, Dartmouth Computer Science Technical Report TR2011-704, Hanover, NH (Sep. 2011).

Research and Markets: Industrial Control Systems (ICS) Security Market—Global Advancements, Market Forecast & Analysis (2013-2018), 1-5 (Nov. 19, 2013).

Schwarz, B. et al., Disassembly of executable code revisited, IEEE Working Conference on Reverse Engineering, 45-54 (2002).

Skorobogatov, S., Breaking Cony Protection in Microcontrollers, 13 pages (2001). URL: http//:www.cl.cam.ac.uk/~sps32/mcu_lock.html [Retrieved May 12, 2016].

Skorohogatov, S., Tamper Resistance and Physical Attacks, Summer School on Cryptology—; ECRYPT (2006).

Slobojan, R., Critical Security Vulnerability Found in QuickSort (Apr. 2009). URL: http://www.infoq.com/news/2009/04/quicksort-security-vulnerability [Retrieved Feb. 19, 2016].

Srivastava, A. and Eustace, A., Atom: A system for building customized program analysis tools, Proceedings of the ACM SIGPLAN 94 Conference on Programming Language Design and Implementation, 196-205 (1994).

Vinciguerra, L. et al., An experimentation framework for evaluating disassembly and decompilation tools for c++ and java, IEEE Working, Conference on Reverse Engineering, 14-23 (2003).

Weingart, S.H., Physical Security Devices for Computer Subsystems: A Survey of Attacks and Defenses, Workshop on Cryptographic Hardware and Embedded Systems—CHES2000 (2000).

File History of U.S. Appl. No. 14/551,508, filed Nov. 24, 2014 (Retrieved Jan. 27, 2017).

File History of U.S. Appl. No. 15/674,084, 157 pages (Retrieved Aug. 28, 2018).

File History of U.S. Pat. No. 9,754,112, 258 pages (Retrieved Aug. 28, 2018).

File History of U.S. Appl. No. 15/674,084 (downloaded Oct. 15, 2019) (264 pages).

File History of U.S. Appl. No. 16/272,405 (downloaded Oct. 15, 2019) (161 pages).

File History of U.S. Appl. No. 14/551,508 (downloaded Oct. 15, 2019) (219 pages).

File History of U.S. Appl. No. 16/272,405 (downloaded Jul. 7, 2020) (371 pages).

* cited by examiner

201
```
unsigned char *p = &s->s3->rrec.data[0], *pl;
unsigned short hbtype;
unsigned int payload;
unsigned int padding = 16; /* Use minimum padding */
```

202
```
/* Read type and payload length first */
hbtype = *p++;
n2s(p, payload);
pl = p;

if (s->msg_callback)
    s->msg_callback(0, s->version, TLS1_RT_HEARTBEAT,
        &s->s3->rrec.data[0], s->s3->rrec.length,
        s, s->msg_callback_arg);

if (hbtype == TLS1_HB_REQUEST)
    {
    unsigned char *buffer, *bp;
    int r;

/* Allocate memory for the response, size is 1 byte
     * message type, plus 2 bytes payload length, plus
     * payload, plus padding
     */
    buffer = OPENSSL_malloc(1 + 2 + payload + padding);
    bp = buffer;
```

203
```
    /* Enter response type, length and copy payload */
    *bp++ = TLS1_HB_RESPONSE;
    s2n(payload, bp);
    memcpy(bp, pl, payload);
    bp += payload;
```

```
VPO-VPC Link Validation
Boundary Check with VPC Address
IF (VPO-VPC Link Unknown) || (Boundary Check Passes)
    Execute VPC Memory Instruction
ELSE
    Perform Predicated VPC Memory Instruction
    //VPC Instruction executes unless boundary is exceeded
```

CHARACTERIZING, DETECTING AND HEALING VULNERABILITIES IN COMPUTER CODE

CROSS-REFERENCE TO RELATED APPLICATION

This patent application is a continuation of U.S. patent application Ser. No. 14/551,508, filed on Nov. 24, 2014, the entire contents of which are hereby incorporated by reference herein.

TECHNICAL FIELD

This disclosure relates generally to characterizing, detecting and healing vulnerabilities in computer code, including silent vulnerabilities.

BACKGROUND

With the proliferation of networked embedded systems, previously inconsequential embedded system nodes are becoming the target of attacks, including attacks by nation states. These embedded systems increasingly perform sensitive roles ranging from controlling our nation's critical infrastructure, to controlling the avionics in airplanes, to routing and controlling communications, and to even controlling medical devices, such as a pacemaker. Accordingly, the compromise of a single node (e.g., device) could have drastic consequences.

SUMMARY

This specification describes systems, methods and apparatus, including computer program products, for characterizing, detecting and healing vulnerabilities in computer code, including, but not limited to, silent vulnerabilities.

An example process includes identifying a location in computer code that is subject to vulnerability, where the location corresponds to a memory access that is repeatable and that operates on a particular type of variable; and performing processes to heal the vulnerability. The example process may include one or more of the following features, either alone or in combination.

The memory access is directly or indirectly related to a system-to-system or a user-to-system interaction that is repeatable. The vulnerability may comprise a way of gaining access to, leaking information from, and/or exploiting/attacking computer code.

The computer code may be executable on an embedded system. The vulnerability may comprise a way of gaining access to, leaking information from, and/or exploiting/attacking the embedded system.

The identifying may include performing a static analysis of the computer code. The memory access may be resident in a loop in the computer program and, therefore, repeatable, and the particular type of variable may be an induction variable. The induction variable may correspond to a register that is only defined once in the loop via a register definition. The register definition may be linear and invariant. The induction variable may enable access to contiguous memory.

The memory access may be a load instruction, a store instruction, a store multiple instruction, or a load multiple instruction.

An example process includes: identifying an instruction in computer code that is a candidate for vulnerability; identifying a point in the computer code at which memory is allocated; determining a link between the instruction and the point in the computer code; and modifying the computer code to affect execution of the instruction based on the link. The example process may include one or more of the following features, either alone or in combination.

Modifying the computer code may include inserting code into the computer code to conditionally execute the instruction. The instruction may be a memory instruction, and the process may include: performing a boundary check on the instruction to determine whether a memory access of the instruction exceeds a memory access boundary established at the point at runtime. Conditional execution may occur based on the boundary check. In a case that the memory access of the instruction exceeds a memory access boundary established at the point at runtime, the conditional execution includes not executing the instruction. The code to conditionally execute the instruction may overwrite the instruction. The vulnerability may be either a silent vulnerability or a modifying vulnerability.

An example process includes: identifying an instruction in computer code that is a candidate for vulnerability; identifying a point in the computer code at which memory is allocated and a boundary therefor is established; determining that the point is on a path in the computer code containing the instruction; and invoking, by one or more processing devices, a handler routine to thwart an exploitation attempt associated with the instruction. The example process may include one or more of the following features, either alone or in combination.

The handler may be configured to update a link table to reflect a relationship between the point and the instruction, thereby establishing a link between the point and the instruction. The example process may include: performing a boundary check on the instruction to determine whether a memory access of the instruction exceeds a memory access boundary established at the point at runtime; and invoking the handler based on the boundary check. When invoked, the handler may be configured to prevent execution of the instruction. The vulnerability may be either a silent vulnerability or a modifying vulnerability.

An example process includes: identifying a point in computer code at which memory is allocated and constraints therefor are established; identifying a memory instruction that is a vulnerability candidate and that is on a path from the point; and invoking a handler to heal the computer code based on the memory instruction being in the path.

An example process includes: identifying a location in computer code that is subject to vulnerability; and performing processes to heal the vulnerability. The location may correspond to a payload that is not defined or allowed by the computer code.

Any two or more of the features described in this specification, including in this summary section, may be combined to form embodiments not specifically described in this patent application.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, and the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DETAILED DESCRIPTION

This disclosure describes example processes for enabling autogenous detection of vulnerabilities in computer code and attempts to exploit those vulnerabilities, and for enabling healing the vulnerabilities in the computer code to inhibit or to prevent current and/or future exploitation. Although the example processes are usable in any appropriate computer system, the example processes are described in the context of embedded systems.

In this regard, in the example implementations described herein, an embedded system includes a computer system (e.g., one or more processing devices and memory) that is resident within a larger mechanical or electrical system.

The embedded system may communicate with external systems, devices, users, and/or networks, and may control or direct operation of the mechanical or electrical system.

An "attack" or "exploitation" is an act that leverages a vulnerability in computer code to gain control of the computer code, to access or to leak information accessible to the computer code, or to otherwise compromise a system's functionality or security. In an example, a vulnerability is a memory instruction within computer code that, along some path of the program's execution, allows for memory accesses that violate intended boundaries in memory, which can potentially lead to compromise at runtime. In an example, an attack or exploitation includes processes by which an attacker causes or utilizes user-system or system-system interactions, which cause a vulnerability to violate intended boundaries in memory. For example, the attack may include an instruction that reads outside of an intended memory boundary, writes a payload that is not intended by the designers, or writes outside of an intended memory boundary. In some implementations, an exploit or attack interacts with the system in a way that may cause gaining control, access to information, and/or enabling further attacks.

The example processes described herein may address both "modifying" vulnerabilities and "silent" vulnerabilities. Generally, a "silent" vulnerability, such as the Heartbleed SSL vulnerability, is or includes a vulnerability in computer code that leaks information without modifying the system on which the code executes. Generally, a "modifying" vulnerability is or includes a vulnerability in computer code through which the code or the system on which the code executes may be modified.

To detect and heal vulnerabilities, the example processes implement a hybrid approach. In some implementations, this hybrid approach includes, among other things, identifying a vulnerability (such as a silent vulnerability) point in computer code, performing path pre-characterization processes and program analyses to characterize the vulnerability, and injecting runtime support or "healing" code into the computer code. This injected code is based on the characterization of the vulnerability, and supports validation, detection, and healing processes (examples of which are described below) that may be performed at runtime.

As opposed to processes that rely on an attacker successfully injecting functionality into computer code, the example processes described herein are able to detect exploitation of silent vulnerabilities in computer code. The recent "Heartbleed" SS vulnerability is an example of a silent vulnerability that, heretofore, has been difficult to detect because there is no integrity violation after an attack. The example processes also include a healing process that is capable, in some implementations, of ensuring that previously-vulnerable code is no longer vulnerable and, therefore, exploitable. The healing process can be also applied globally to homogenous, networked embedded systems after detection of a vulnerability. In some implementations, the example processes are CPU and operating system agnostic and, thus, may be applicable across any appropriate technology.

The example processes are based on the fact that, fundamentally, attempts at exploiting (or attacking) computer code running on embedded systems require either system-to-system or user-to-system repeatable interactions. During normal system operation, these interactions may drive the underlying functionality that the embedded system was designed to implement. But, when created or formatted in a specific way, these interactions can provide ways of gaining access to, leaking information from, or exploiting/attacking an embedded system. The example processes characterize these interactions statically, as described in more detail below. In this context, static program analysis includes the analysis of computer code that is performed without actually executing the computer code. The example processes also translate the resulting characterization into a generic program analysis that can be approached systematically. In some implementations, the example processes do not require foreknowledge of, or a signature or identify of, a specific attack/attempted exploitation.

In an implementation, the example processes perform a static analysis on an embedded system's code (e.g., its firmware). The static analysis is performed to identify a vulnerability point (e.g., a silent vulnerability point) in the computer code, and can be applied at the source code or binary code level. Based on this static analysis, the example processes identify, offline, some or all points in the application that meet one or more predefined criteria required for exploitation. In some implementations, the static analysis includes, e.g., identifying a subset of memory instructions (enabling access to system memory) that reside in a loop (the loop providing repeatability) and operate on an induction variable (an induction variable enabling access to contiguous memory). Using static analysis, in some implementations, some (e.g., the majority of) memory instructions can be further filtered, e.g., removed from consideration, if the instructions are not related to the possible interactions (e.g., system-to-system or user-to-system repeatable interactions). The remaining identified memory instructions are referred to as "vulnerability point candidates" (VPCs) in that they are points in the code that have possible vulnerabilities and, thus, are candidates for exploitation.

In some examples, a VPC is a memory instruction that meets certain requirements, such as those described above. In this example, to be considered a VPC, a memory instruction has the potential to be influenced by user-system or system-system interactions, is repeatable/predictable, and has a predictable memory access pattern such that it can be exploited. In view of these requirements, in some implementations, a VPC is determined as follows. First, a VPC is an instruction that cannot be proved statically to not be potentially influenced by user-system or system-system interactions. Double negation is used in this definition since it allows the VPC to capture all vulnerabilities by starting with all instructions and removing only those that can be proven not to be actual vulnerabilities (as defined above). Combined with the other requirements, in compiler terminology, VPCs can be mapped to memory instructions that cannot be shown to not be influenced by user-system/ system-system interactions (e.g., possible vulnerabilities) with intra- and inter-procedural analysis (described below), and that are loop-induction-variable affected in an affine pattern (e.g., a repeatable and predictable memory access pattern for a meaningful attacker payload). Affine memory access is used here as is generally defined in the field of compilers and computer architecture. Specifically, it is a memory access that has a known linear access pattern at runtime. This is typically achieved when a memory access address is based on a loop index variable with constant coefficients and additive constants. The difference between subsequent addresses for an affine memory access at runtime is called a stride. Affine memory accesses typically have well defined and constant strides.

A path in the computer code (e.g., a branch) to a VPC includes what is referred to herein as a "vulnerability point of origination" (VPO). In some implementations, a VPO is defined to be the point (e.g., the instructions, routine, definitions, or the like) in computer code at which any kind of memory is allocated and constraints therefor (e.g., its intended boundaries and range) are established. This includes both static (fixed at compile time) and dynamic (runtime-dependent) memory allocations. VPOs may be identified through a combination of static analysis and runtime (inserted off the critical path statically but operating at runtime as a measurement of dynamic VPOs) approach. VPOs are characterized through the boundaries of memory they define. Each VPO has two components—statically identifiable code in the program that performs memory allocation when executed and a range of memory that is allocated by that code when it executes at runtime.

Memory allocation code for all VPOs can be determined statically at compile time. Memory allocation can be static or dynamic. Static allocation is known at compile-time while dynamic allocation is runtime specific. However, VPO support code can be inserted at compile time at any VPO, to record the range of memory allocated by that VPO at runtime e.g., in a table. This means that all VPO memory allocation ranges can be known at runtime whether static or dynamic.

Vulnerability Point Candidate Parameters (VPCPs) for a VPC are a set of runtime parameter values that control the actual range of memory accessed by a VPC in a given execution instance. A VPCP is related to a VPO, but it could be altered from the allowed VPO parameters during an exploit situation (through system-system or user-system interaction). In some implementations, a healing code for a VPC prevents a VPC from executing when VPCPs violate in the boundaries of the memory the VPC accesses in any manner.

A VPO-VPC path is a path of execution, beginning with a VPO and ending at a VPC. VPO-VPC links are loaded into a table in memory as they are encountered at runtime. The example processes may determine the VPO-VPC links by correlating, or coupling, VPOs with VPCs through interprocedural analysis.

The example processes prepare the computer code (e.g., firmware) for direct detection of exploitable vulnerabilities in the code and for autogenously healing of these exploitable vulnerabilities. While inter-procedural dataflow analysis can be complex in some cases, the correlation process does not have to be fully provable statically. This is because, in some implementations, VPO-VPC coupling validation can be completed at runtime, as described below, with relatively low overhead, enabling a practical static analysis implementation (since correctness does not depend on its completeness or accuracy in some implementations).

In an example implementation described below, during a static analysis, the example processes inject code into computer code (e.g., the embedded system's firmware). The injected code aids in runtime triage of VPOs and VPCs by providing coupling information relating to the VPO and VPC. In some cases, only a fraction of memory accesses meet the VPC/VPO requirements (e.g., memory instructions that reside in a loop and operate on an induction variable, or an origination point for the memory instructions). The runtime triage performed by the injected code also identifies, and therefore eliminates from further consideration, at least some memory accesses that do not meet the VPO/VPC requirements In this example, code is also injected to implement procedure-level tracing, to identify boundary conditions at VPOs, to validate VPO-VPC links at runtime, and to perform an explicit VPC-specific predicated boundary check to enable detection of an exploitable vulnerability. An example of how a boundary check enables detection is provided below. In some implementations, the code is injected off-the-critical path of execution, includes a relatively few number of instructions, and uses predicated execution (e.g., conditional execution of instructions). In architectures such as ARM, these factors can reduce the impact on performance and code-size.

In this regard, healing-related "support code" includes code that has been inserted into computer code off-the-critical path to enable (i) dynamic VPO capture (identification), (ii) VPO-VPC link capture (identification), (iii) VPO-VPC link lookup, and (iv) validation of VPO-VPCP-VPC constraints at a given time instance (equivalent to exploit detection). These support code is inserted and executes prior to a VPC and operates on a set of VPCPs to that VPC and boundaries of the memory that the VPC accesses. Support code can be inserted at compile time, prior to any VPC, to pair a VPC with a VPO at runtime. At this time, a link can be established, and VPO memory allocation ranges recorded in a VPO-VPC link table beforehand at the VPO are known. Since all VPO memory allocation ranges are established at runtime and VPO-VPC link support code is run for all VPCs, all VPO-VPC links can be established at runtime.

Actual healing code can be injected/inserted into the computer code on the-fly-after detection of an exploitation attempt or attack, and/or could be prepared for beforehand statically and predicated based on the runtime constraints looked-up from the VPO-VPC link table. The healing code can be executed at run-time, as described below, e.g., to prevent execution of all memory instructions that are vulnerable to exploitation or attack through predicated execution of those instructions, to call an exception handler to selectively prevent execution of memory instructions that are actually subject to an exploitation or attack, or to perform other types of operations that inhibit or prevent exploitation or attack. Example implementations of the healing processes are provided below.

In some implementations, the autogenous runtime healing performed by the example processes addresses scenarios in which a VPO-VPC link was not identifiable statically (as was the case in the foregoing examples), but was uncovered by execution of validation code at runtime. The VPO-VPC link may not be identifiable statically for several reasons, e.g., due to ambiguous branching through dynamic and register-based targets, compiler optimizations, dynamically linked libraries, etc. At runtime, since the VPO and the path from which the VPC was reached is known, a previously unknown VPO-VPC link can be created autogenously by the validation code, thereby enabling healing on the same path the next time that the path is executed.

The validation code may identify the VPO-VPC link at runtime, as described below, by checking the address at runtime that will be utilized and then identifying the VPO to which it belongs. For example, the link between the VPO and VPC can be identified at runtime by hashing/comparing the runtime extracted VPCP range with the recorded VPO ranges or, alternatively, by hashing the VPC's address with all recorded VPO ranges, and checking for a match.

Identification of a vulnerability does not mean that an attack is in progress. However, since the path is possibly vulnerable, in some implementations, the vulnerability may be healed by making a linkage between the VPO and VPC explicit which, in turn, enables a VPC boundary check. In this regard, in an example, VPO support code may be added to the computer code at each VPO and prior to each VPC. Since VPO support code is present at all VPOs in, all VPO memory allocation ranges can be established at runtime. Since VPO-VPC link support code is present prior to each VPC, this code can look-up VPO memory allocation ranges prior to each VPC. As noted, the link between the VPO and VPC can be identified by hashing/comparing the runtime extracted VPCP range with the recorded VPO ranges or, alternatively, by hashing the VPC's address with all recorded VPO ranges, and checking for a match. Since all VPO memory allocation ranges are established at runtime, the VPO memory allocation ranges will be present in the table before reaching the VPC, and a VPCP or VPC based matching for a linkage can always be completed. Thus all VPC-VPO links can be captured.

The actual predicated execution can be completed either on-demand after an attack or simply by preparing the code statically and using runtime information to perform a VPC boundary check (e.g., check to compare that the memory access for the VPC has the same range, or other characteristic(s), as the memory access the VPO linked to the VPC). In this regard, the link between the VPO and VPC for the path leading to this VPC can be established at runtime. This means that the boundaries for the memory allocated at this VPO are recorded in memory and available upon reaching this VPC. Supposing that healing code and validation support code have been inserted prior to this VPC, then its VPCPs are extracted and validated against the boundaries recorded at the VPO for memory accessed by this VPC, or the VPC address itself is checked against recorded ranges. In the event of an actual vulnerability, the memory boundaries established at the VPO would be violated for the current VPC and the healing code prevents the execution of the vulnerability by predicating execution for the VPC on the boundary check, and preventing execution thereof when the boundary check fails.

Through the use of a centralized server, the VPO-VPC link and other exploitation-related information can be distributed across a wide array of embedded systems, both homogeneous and heterogeneous, based on actual usage, thereby enabling healing of devices within a population autogenously. Examples of runtime detection and healing processes are described below.

Silent Vulnerability Example

Described below is an example of a contemporary silent vulnerability dubbed "Heartbleed" in the OpenSSL library. One of the features of the example processes is that the example processes are applicable to such silent vulnerabilities, as well as to vulnerabilities that make changes to system memory or firmware.

The Heartbleed vulnerability was, at least partly, the result of a failure to perform a memory access boundary/size check when responding to an SSL heartbeat message. When sending this heartbeat message, an untrusted client controls its contents, including its payload and an element indicating the size of the provided payload. To exploit this vulnerability, a client simply creates a custom SSL heartbeat packet that indicates a payload length, which is greater than the actual size of the payload provided (e.g., include only 1 byte of payload, while indicating the length provided was 64 k). The SSL server then sends a response, which includes all of the requested memory including memory that is beyond the boundary of the intended SSL3_RECORD structure.

Figure 2:
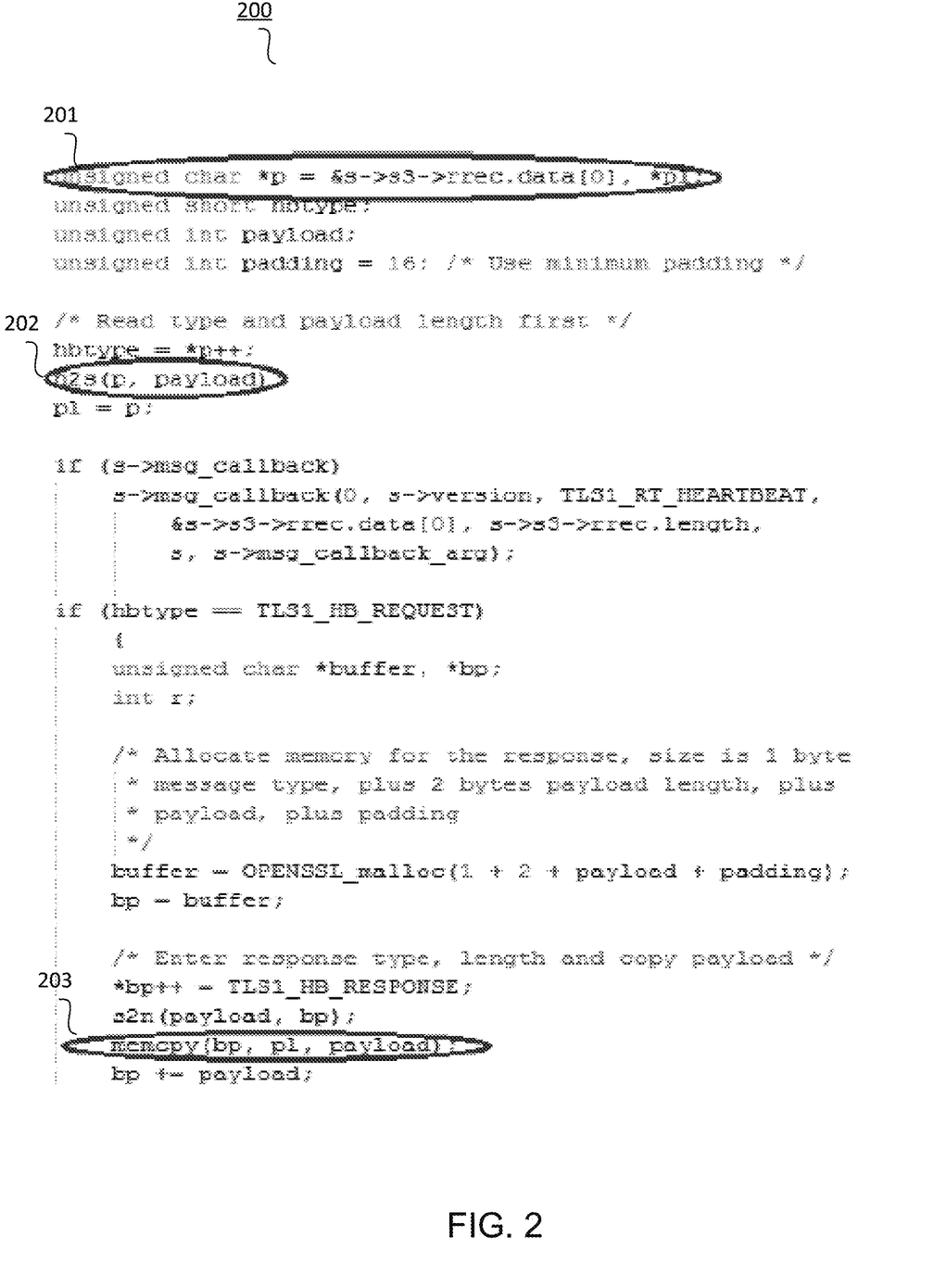
FIG. 2 is an example of source code for the Heartbleed vulnerability.

FIG. 2 shows an example of source code 200 containing the Heartbleed vulnerability, with lines of code contributing to the Heartbleed vulnerability circled. The first circled line of code 201 shows a pointer to the SSL3_RECORD structure being initialized. This pointer is used by the macro n2s in the second circled line of code 202 to retrieve the length for the data provided with the heartbeat payload (the variable named "payload" is used for the length). The client has control over this variable, and its value is not checked. In the third circled line of code 203, the memcpy procedure is used to copy bytes from a user-provided data buffer to a response buffer, which is where an actual exploitation can occur. A problem here is that the client can control both the buffer contents and the indicated size, while the memcpy procedure has no knowledge of the actual size of the buffer from which the data is copied. This is problematic because there is a potential for buffer accesses that violate intended boundaries of the buffer.

An analysis of a vulnerable version of the OpenSSL library compiled for the well-known ARM architecture indicates that the detection and healing processes described herein can be applied to the Heartbleed vulnerability. In this example, the VPC for this vulnerability is located within memcpy in libc, where memory contents are copied from source to destination. libC here refers to the standard cell library commonly used in compilers. This library implements functions that are common in computer code. The location of the VPC is determined according to the static analysis described above.

Figure 3:
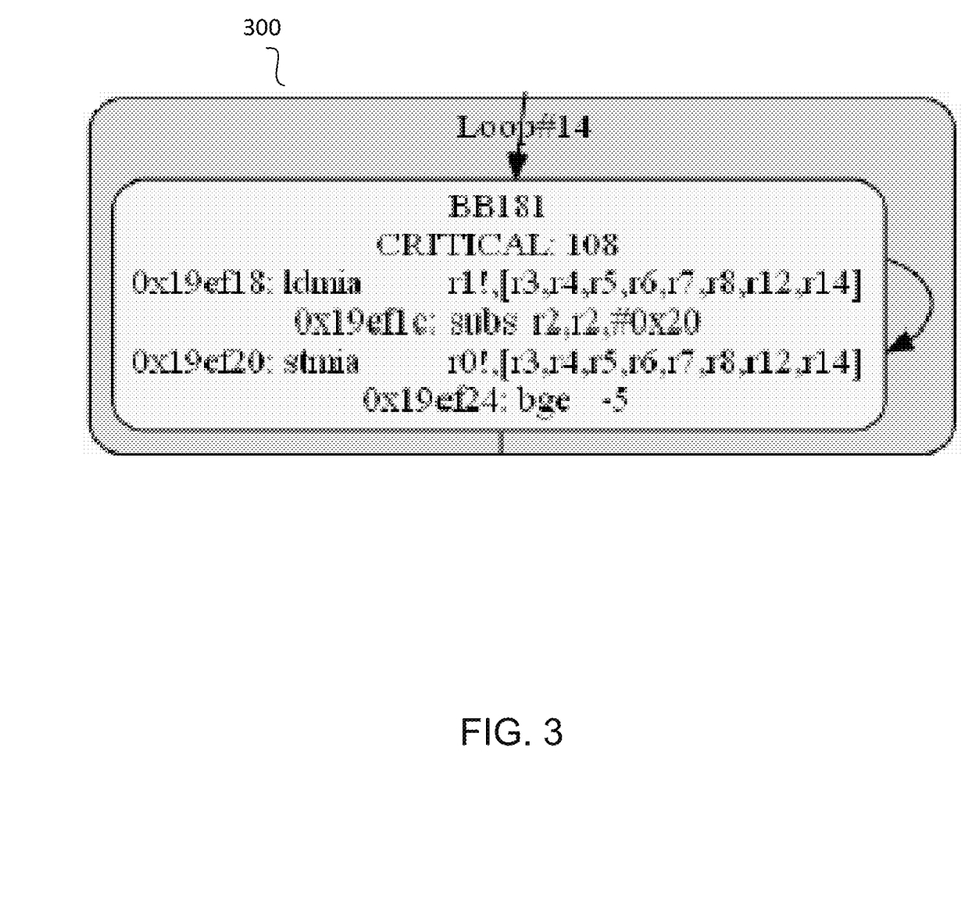
FIG. 3 is an example of a loop in code that meets the conditions for a vulnerability point candidate.

In this regard, FIG. 3 shows the body of an example loop 300 in code for handling a base case for copying bytes within memcpy. This loop copies 32 bytes (8 words) at a time from source to destination using the load multiple instruction (ldmia) and the store multiple instruction (stmia).

A feature of these instructions is a post-increment operation (denoted by the '!'), which indicates that the base register for the load and store operation (r0 and r1 in this case) is updated. These post-increment operations cause registers r0 and r1 to be induction variables within this loop, thus causing both of these load/store instructions to be VPCs. The other loops within the memcpy procedure (e.g., for handling non-base cases, such as for copying unaligned leading/trailing bytes) contain similar load/store instructions that use induction variables for their base addresses. In some implementations, the VPCs may be instructions that are loads or stores multiple (this is a type of instruction where a single load is, in effect, a chain of loads).

In this example, the memcpy contains two sets of VPCs in each loop—one for the source buffer and one for the destination buffer. In the Heartbleed vulnerability, the VPC for the source buffer is exploitable, causing it to be a silent vulnerability. The VPC for the destination buffer is a non-silent or modifying VPC because it modifies the code or system. Another point of note is that the vulnerability is not the result of a missing or improper size check within memcpy. The memcpy procedure takes an explicit size argument, which is properly enforced. The problem here is that memcpy has no knowledge of actual buffer boundaries at the source; its only boundary condition is based on the number of bytes specified by the caller to be copied. This vulnerability also indicates that secure versions of standard libc functions such as strncpy (as opposed to strcpy), which take an additional argument indicating length, are not inherently secure. This is because they check a length argument. Although these secure functions encourage good coding practice and make it easier to write more secure code, this example using memcpy evidences that even these "secure" functions can contribute to vulnerabilities.

The following describes example processes for characterizing static vulnerabilities in computer code, for detecting vulnerabilities in computer code at runtime, and for healing the detected vulnerabilities.

Binary-Level Static Analyses for Vulnerability Characterization

In this example, the characterization process operates on a post-compiled embedded system firmware binary, which is a type of executable computer code. However, the example characterization process described herein is not limited to use in this context, and may be used with any appropriate computer code. The example characterization process, in this implementation, is performed to prepare the binary statically so that the binary itself can detect vulnerabilities and heal those vulnerabilities at runtime. That is, the binary is self-healing, in this example, making it less vulnerable to attack, and more secure overall.

Described below is a static analyses used to identify the following: VPCs, VPOs and VPO-VPC links. It should also be noted that while a binary-level approach is described, the following compiler techniques are also applicable in source-level compilers or to any other appropriate tools. The compiler techniques described below are not limited to use in the context presented, and may be used under any appropriate circumstances with any appropriate code.

When attempting to statically identify potential vulnerability points, it may be useful to examine the problem in terms of the goals of an attacker. The main goal of many attacks is to either leak critical information or to inject a malicious payload into a system. In some (or all) examples, the attacker requires an entry point accessible through external interaction (e.g., over-the-wire, system-to-system, or user-to-system), and the ability to access system memory.

The example processes described herein, which include vulnerability point detection and vulnerability characterization techniques, identify points (e.g., all points) within computer code (in this example, firmware) that support the attacker's needs, and thus that are points in the code that are vulnerable to attack or to exploitation by malicious code or third parties. In terms of program analysis, in this example, this includes identifying and classifying memory instructions (enabling access to system memory) that reside in a loop (providing repeatability) and operate on an induction variable (enabling contiguous writing in memory to inject a meaningful malicious payload). In some implementations, the example processes exclude memory instructions that are proven not to be carrying a payload that is a result of aforementioned interactions (namely, system-to-system or user-to-system repeatable interactions). The remaining (non-excluded) memory instructions are VPCs, as explained above.

In some implementations, the example processes also identify code that is responsible for allocating memory locations that can be accessed or modified by the VPC. As described above, this code is referred to as a vulnerability point origin(s) (VPO). As described below, in some implementations, the example processes also identify the existence of a link between VPOs and VPCs to enable autogenous runtime vulnerability detection and healing. In this context, a link between a VPC and a VPO means that the VPO defines the memory allocations for the VPC. In other implementations, the VPO may have a different meaning.

The example processes provably capture real vulnerabilities at their VPC points, since the processes are able, among other things, to identify an instruction (a VPC) that reads outside of an intended memory boundary designated by a VPO. False positives may also be present, since not all identified VPCs can actually be exploited or attached. Nevertheless, while, in this example, the processes capture all VPCs that are exploitable, the processes may not result in significant overhead because speculative modifications are completed off of the critical execution path of the firmware and only a fraction of memory accesses are affected. Additionally, through the use of a runtime VPO-VPC link validation technology, the example processes are able to substantially maintain functional correctness.

Support for Induction Variable Identification Relevant to VPCs

As noted, one characteristic of a VPC, in this example, is its operation on an induction variable or equivalent (e.g., load, store multiples, and so forth). In this example, an induction variable relates to: a register that is only defined once in a loop, the register definition is linear and invariant, the register definition occurs on all loop paths, and the register definition does not exist in an inner-loop. VPC-related analyses often include more cases than are typically considered in induction variables, e.g., the register definition may not necessarily need to occur on all paths. On the other hand, certain types of linear transformations that are based on large strides may be ignored since they may be unfeasible for an attacker. For example, practical attacks require contiguous access or predictable short strides.

Figure 4:
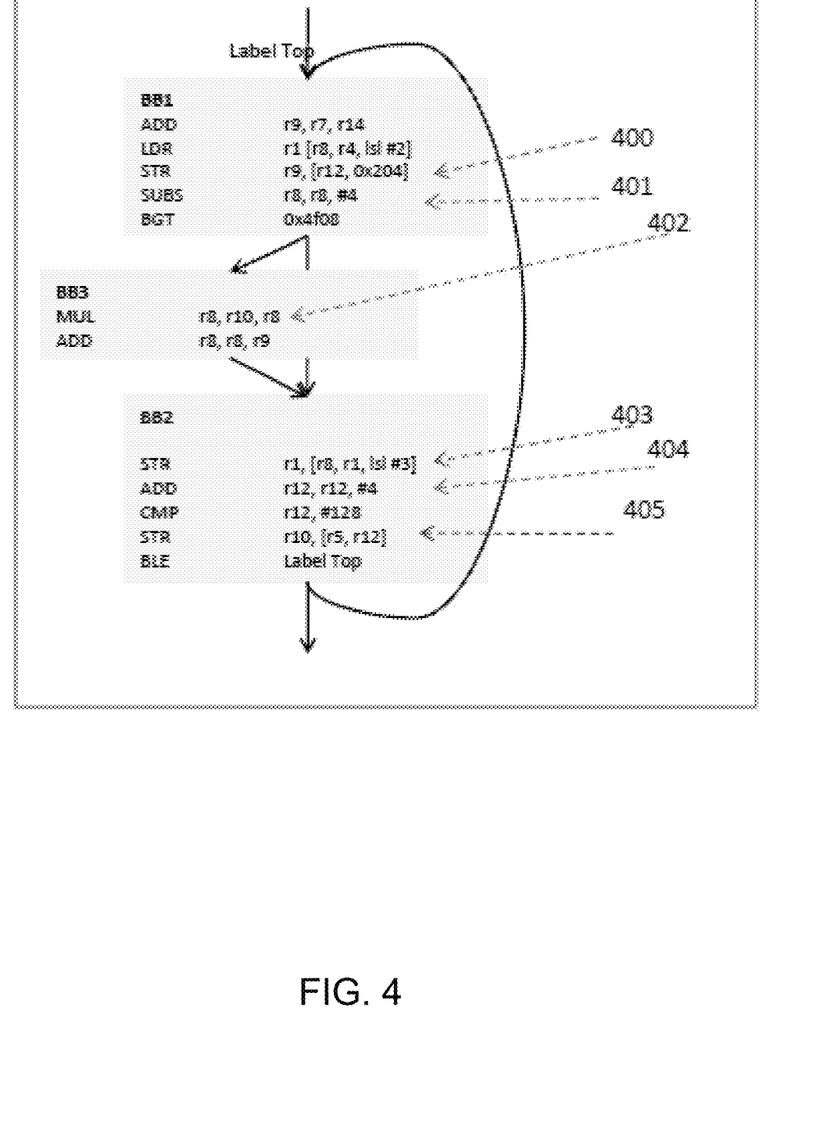
FIG. 4 is an example of a control flow graph showing induction variable assignment in computer code.

FIG. 4 shows an example of a loop and control flow to illustrate the identification of induction variables and VPCs. In this first example, the loop structure includes three basic blocks. The arrows and associated instructions highlight some situations of interest with regards to induction variable identification. Line 404 highlights an instruction that increments r12 by constant value #4. Because r12 is only updated by this instruction and is resident in a basic block that is provably reached via every loop path, it meets the criteria of an induction variable that is also relevant for VPC identification In this example, r8 is not deemed to be an induction variable relevant to VPCs in this loop. In basic block BB1, r8 is decremented by a constant value of #4 in every loop iteration. If this were the only definition of r8, this would qualify as an induction variable. However, r8 is also modified through a multiplication instruction on one of the paths that would remove it from VPC consideration since it has a non-linear access pattern. In some instruction sets registers used in address definition could automatically be incremented or decremented effectively becoming induction variable candidates.

Vulnerability Point Candidate (VPC) Identification:

In some implementations, an example VPC identification process directly ties into the example exploitation detection, the example runtime path identification, and the example healing process, which are described herein.

In this regard, most loops contain many memory instructions. In fact, statistically, it can be expected that in a RISC binary, 25% of the instructions will be memory instructions, with a third of these being memory writes. The example processes attempt to identify a specific class of memory writes that can enable the goals of an attacker, such as VPCs.

The example in FIG. 4 has several memory instructions of interest. Instruction 405 could represent a VPC since it is based on an induction variable and has a linear access pattern, if the instruction also could not be excluded for being unrelated to system-system or user-system interactions. This example shows an instruction that stores the contents of r10 to the memory address defined by the expression r5+r12. As previously noted, in this example, r12 has been identified as an induction variable. Conversely, 403 highlights a store instruction that does not meet these criteria. This instruction relies on r8 and r1 to define its address. In this loop, as shown, r8 is not identified as an induction variable because it is modified in a non-linear fashion. The other address register, r1, is also defined via a load instruction, overall causing an access pattern that cannot be leveraged by an attacker for payload insertion.

Finally, instruction 400 highlights an example of an instruction that turns out not to be a VPC. It stores the same invariable content of r9 into the memory. r9 cannot be modified in the loop since it is based on the sum of two invariant registers r7 and r14. Because an attacker's goal typically is to write a meaningful payload into memory to enable further exploitation, code to write a constant is not classified as a VPC in this example implementation. However, in other implementations, this may not be the case; that is, in other implementations, code to write a constant may be classified as a VPC or may relate to classification of a point in code as a VPC.

Intra-Procedural Data Flow Process for Identifying VPOs

An example data flow analysis process for identifying VPOs is based on procedure-level intra-procedural data flow and memory disambiguation. In this example, a VPO includes computer code (e.g., firmware), which allocates a contiguous block of memory for use in holding some variable, array of variables, or the like. In this example, a VPO requires the assignment of a start address and a size component, thereby assigning the memory boundary. In this example, the size component is not explicitly required so long as the next variable/memory block allocated has an address that reflects the previous memory allocation's size such that at runtime there is no aliasing. By static disambiguation, the example processes are able to obtain memory allocation sizes, e.g., boundaries, either explicitly or are able to inject code to obtain memory allocation sizes at runtime by comparing contiguous memory allocations' start addresses.

In order to perform the static disambiguation, in this implementation, the example processes may use a data flow analysis that is based on points-to-graphs based memory disambiguation techniques, which are used to determine location sets for memory accesses in alias analyses. In this example, a location set for a memory access is defined as all possible locations, identified by addresses and address ranges, that the memory access can point to at runtime. A points-to graph is, in an example, a graph that shows, for all memory instructions in a procedure, all locations to which the memory instructions can point. An accurate, e.g., statically provable, analysis is not necessary for functional correctness in some implementations. This is due to the inclusion of VPO-VPC link validation code in computer code for a procedure, which is able to determine the linkage and to validate the linkage at runtime. Example of VPO-VPC link validation code is described below.

Inter-Procedural Analysis for VPO-VPC Link Identification:

Information representing location sets for memory accesses is used in tying, at runtime, a boundary condition associated with a VPO to a VPC that defines the memory access requirements of the VPC. In order to determine the information statically, two types of analysis may be used by the example processes. The first analysis is a procedure call-graph analysis. This analysis statically determines possible (e.g., all possible) inter-procedural edges that can be exercised at runtime. In some implementations, the example processes use the results of this analysis to create a link between a single VPO and all possible VPCs from which the VPO can be reached. After this is link created, the second analysis is performed. In this example, the second analysis includes performing an inter-procedural data flow analysis on the code in an attempt to prove that it is possible that the VPC can operate using the memory allocated by the VPO.

Runtime Exploitation Detection and Healing

The example processes identify the foregoing components (VPC, VPO, and VPO-VPC linkage) using the above-described static analyses. In this example implementation, the example processes then modify the computer code (e.g., firmware) to support autogenous detection, at runtime, of vulnerabilities that may be subject to exploitation or attack, and to support healing of those vulnerabilities. The computer code may be modified to perform these functions, e.g., through code transformations and injections, some static and some potentially occurring at runtime. In some implementations, there are two main code modifications that may be performed: (1) insertion of VPO-VPC link validation code, and (2) insertion of code to perform boundary predicated (conditional) VPC checks.

Validation Code for VPO-VPC Links

The VPO-VPC link validation code (or simply, "validation code") is used to confirm VPO-VPC links at runtime by, for example, determining if the actual VPC start address resides in a known VPO address range. The VPO address range may be determined based on the start address and size information stored in a table of identified VPOs. The validation code is placed into a corresponding VPC procedure, but outside of a loop containing the actual VPC to mitigate performance impact. In this example implementation, there are three example scenarios associated with validation processes supported by the validation code at runtime.

In a first example, there is a statically-identified VPO linked to a VPC. In this example, a prior static analysis has provably determined that a specific VPO contains a link to the VPC that has been reached, and this determination has been confirmed by the validation code. In this example, the boundary information created and stored at a point of the VPO point is extracted, e.g., from memory, and a VPC-specific predicated boundary check (described below) is performed in order to detect a vulnerability in the computer code. This case reflects a vulnerability that was identified statically and properly augmented to enable runtime detection and implicit healing of the vulnerability prior to runtime. That is, prior to runtime, the VPCs are replaced by code to perform predicated boundary checks at execution. If a boundary check fails (e.g., the VPO-allocated memory does not match the memory access of the VPC), the VPC is not executed, resulting in healing of the code. In another embodiment, after the checking of the violation of boundary, the VPC code is replaced at runtime to perform the VPC and execute VPC if the boundary is not violated.

In a further example, the VPO is not linked statically to the VPC, but is found on a path containing the VPC. Upon detection of this case by the example processes, a handler is invoked to autogenously heal the computer code (e.g., firmware) from this statically unidentifiable vulnerability path. The handler updates the VPO-VPC link table to reflect this relationship such that, should an exploitation attempt target this VPO-VPC pair, the exploitation attempt would be detected in the manner described above (e.g., through an appropriate boundary check) and stopped (e.g., through preventing execution of the VPC). Additionally, in an example implementation, the handler could also communicate this information to a centralized server for distribution to other systems. A boundary check is performed in this example as well, since boundaries can change at runtime to address virtualization and dynamic ranges. Any of the example processes described herein for performing the boundary check may be used to perform the boundary check here.

In a third example, there is no identified VPO linked to a VPC. Taking the previous case further, this likely reflects an incomplete intra-procedural memory disambiguation aimed at identifying VPOs. However, since path information exists as to how the VPC was reached (for example, tracing code may be inserted on a per procedure basis), communication with an external centralized server can invoke an updated offline static analysis of the computer code with the runtime information (path, allocated memory address and VPC) in an attempt to identify a new VPO. Should this occur, an updated firmware image can be transmitted and upgraded by the exception handler following a Trusted Computing Group (TCG)-specified secure Field Upgrade methodology as described in its Trusted Platform Module specification. The TCG is an industry consortium that defined specifications for security. Field upgrade can also follow other proprietary approaches.

Predicated Check or Predicating VPCs

Figure 5:
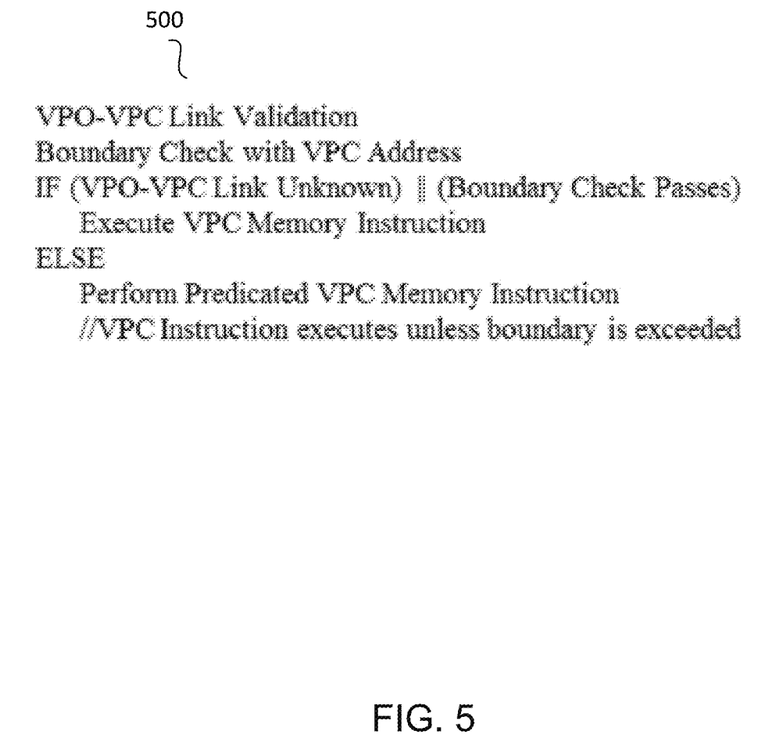
FIG. 5 is an example of pseud-code for runtime validation code and predicated execution of instructions at a vulnerability point candidate.

As described above, a predicated VPC boundary check is an example of a procedure implemented by the example processes to detect vulnerabilities in computer code and to heal those vulnerabilities at runtime. In some implementations, this boundary check occurs directly at a VPC instruction. A purpose of this boundary check is to ensure that a VPO-established memory access boundary is not exceeded at runtime by a VPC. To perform this check, a compare instruction sequence may be injected into the computer code to compare the established boundary with a memory address being accessed by the memory instruction that has been designated as the VPC. In some cases, depending on which condition flags are used, the compare instruction sequence could be placed outside of a loop containing the memory instruction. In some implementations, only if the boundary is not exceeded will the memory instruction execute. If the boundary is exceeded, the memory instruction will not execute, thereby "healing" the code. In some implementations, with a VPO related to identifying payloads that are not defined relative to address ranges, the example processes may determine that a payload identified on a non-checked path is to be stopped even if a boundary was not exceeded. This example uses a different VPO that corresponds to a payload that is not explicitly allowed or defined by the computer code, and that captures this information. This information may be determined in one or more control-flow analyses, and the example processes described herein may be used to prevent or avoid execution of any instructions that uses or relies upon that payload, thereby healing the computer code, as described herein In some implementations, the example processes produce only a single instruction overhead. This is achievable through the use of predicated execution. In this example, predicated execution includes the conditional execution of instructions based on condition flags, without the requirement of a traditional if-then-else branching sequence. In this case, in addition to the compare instruction that was inserted into the computer code, the original memory instructions in this case, e.g., the VPC, is updated to implicitly only execute based on condition flags set by the injected compare instruction. For example, the original memory instructions will only execute, in some implementations, when the condition flags indicate that the boundary has not been exceeded based on a result of the compare instruction. FIG. 5 shows example pseudo-code 500 implementing the above-described validation code and predicated boundary check.

In a case where a boundary is exceeded, which reflects an attempt at exploitation or attack, there are multiple options. As described above, one option is to simply ignore any memory accesses after the boundary and to continue execution of the code. This corresponds to a healed VPC. As also described above, a handler may be invoked to make other systems aware of the exploitation attempt and to enable healing in other devices. VPCs are still only candidates for exploitation and healing until an actual exploitation attempt occurs.

Overview of Binary Compiler

Figure 1:
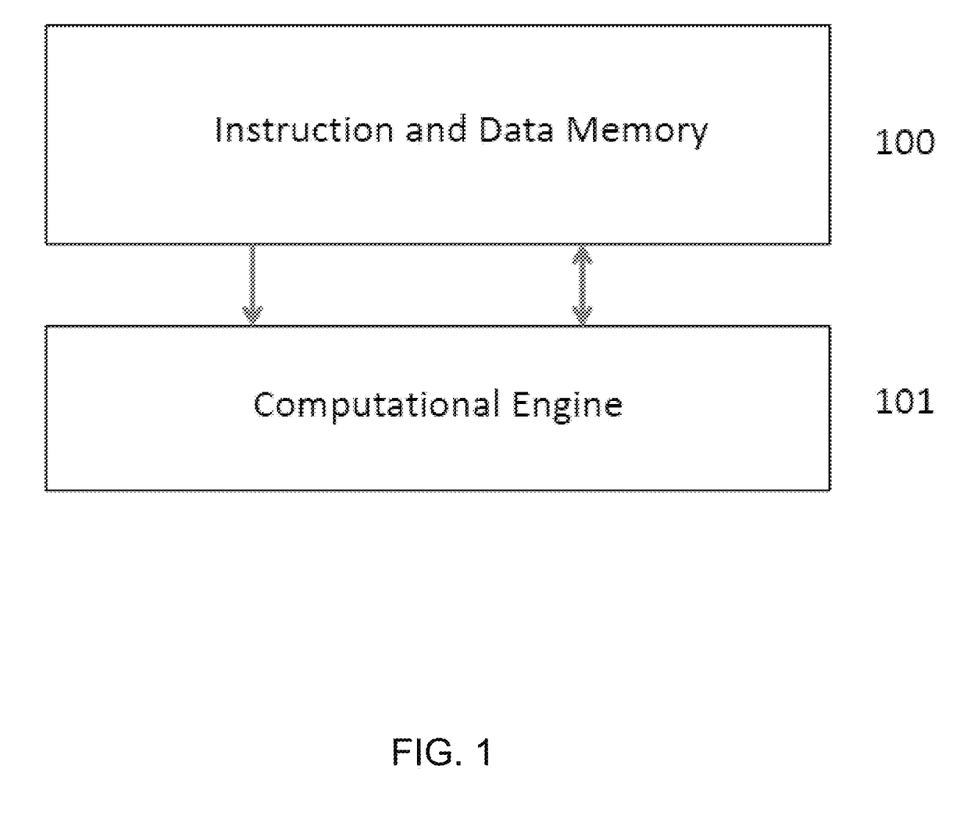
FIG. 1 is a block diagram of components of an architecture on which the example processes described herein may be implemented.

FIG. 1 shows example hardware on which the example processes described herein may be implemented. Referring to FIG. 1, the main functions of a device or apparatus executing program code is shown. This is implemented on an architecture commonly referred to as the von Neumann computer. It is a functional model of the abstract symbolic automata, commonly referred to as the Turing machine. In this example, computer code (software) is stored in some memory or backup store (100), and it encodes operations for its compute engine (101). The resulting output can be stored internally or written back to memory or a backup store (100).

Described below is an example of a binary-level compiler that may be used in the example processes described herein. As noted, however, the example processes are not limited to use with binary-level compilers, or to use with this particular type of binary-level compiler. Any appropriate compiler may be used with the example processes. The example binary-level compiler described herein includes support for program analyses, compiler transformations, and code generation. The example binary-level compiler differs from binary instrumentation tools, which can read in executables but do not typically contain an intermediate format, infrastructure, and processes to enable program analyses and transformations. However, such tools can also be extended in conjunction with the binary-level compiler, as can source-level tools.

Figure 6:
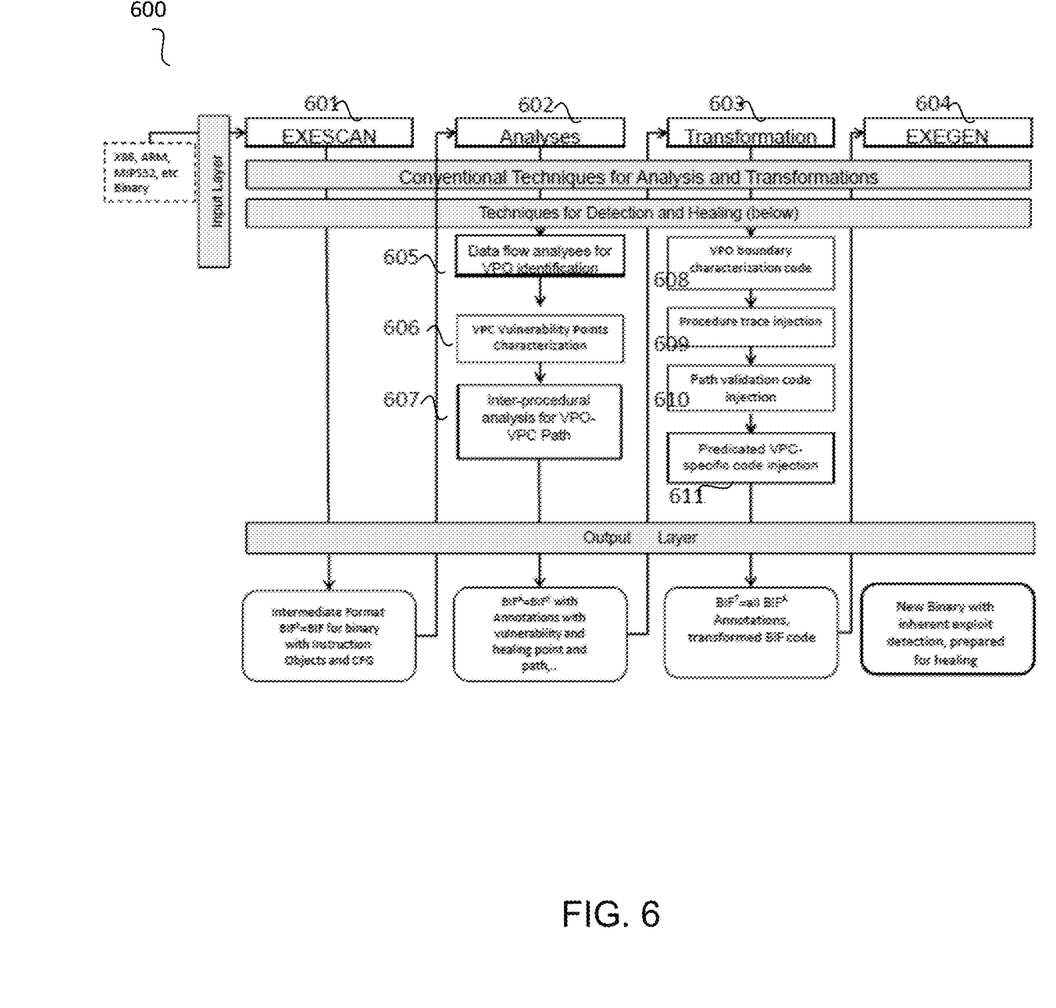
FIG. 6 is a block diagram of components of a binary-level compiler.

FIG. 6 shows an infrastructure for a binary-level compiler 600. In the example of FIG. 6, the compiler includes four phases: ExeScan (600), Program Analyses (601), Program Transformations (602), and ExeGen (604). The ExeScan (Executable Scan) phase operates on a compiled executable (support for example ELF, and PE exists), with the role of disambiguating text and data sections to create a binary intermediate format (BIF) upon which the following stages can operate. ELF stands for Executable and Linkable Format. PE stands for Portable Executable. These are commonly used binary encoding formats. Others can be also supported. This phase traverses the executable's code, filling the intermediate format with structures of varying levels of abstraction ranging from the procedure-level, to the basic block level, down to instructions containing operands and registers. In this example, the processes performing this "control-flow building" operation are written in an ISA (Instruction Set Architecture) agnostic fashion, with a specific module (a decoder) that is ISA dependent. This translates into a tool that can be updated to support new ISAs.

Upon completion of ExeScan, the core phases of the compiler contain program analyses and transformations. Example analyses and transformations are shown in FIG. 6. These are mainly ISA independent and are performed on a symbolic intermediate format. Some of the analyses include, but are not limited to, local and global criticality analysis, loop and weight analysis, induction variable analysis, register liveness, inter- and intra-iteration dependencies, various data flow analyses for memory disambiguation, stride, and reuse. When run, the intermediate format is annotated with information collected for use by later phases. Transformations in the compiler include various performance related transformations ranging from renaming, to stall removal, to sophisticated loop transformations including loop unrolling and software pipelining for exposing instruction level parallelism, and global instruction scheduling. In this example implementation, all of these transformations are completed on the BIF intermediate format and are fully generic (e.g., not ISA-specific).

The final pass of the example compiler is called ExeGen (Executable Generation). In this phase, a new binary is generated based on the transformed intermediate format and the information collected throughout previous analyses. In order to perform binary generation in this example, artifacts of previous analyses and transformations, such as relocated code, virtualized registers, branch target updates, insertion of any static data, etc. are resolved. The final operation in this phase is the assembly of a new binary. This includes updating the original binaries headers, section table entries, text and data sections, and symbol table information, if it exists/needed.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Elements of different embodiments described herein may be combined to form other embodiments not specifically set forth above. Elements may be left out of the processes, computer programs, etc. described herein without adversely affecting their operation. Furthermore, various separate elements may be combined into one or more individual elements to perform the functions described herein.

Other implementations not specifically described herein are also within the scope of the following claims.

What is claimed is:

1. A method comprising:
performing a static analysis of computer code using one or more processing devices to identify a part of the computer code where a memory allocation is established;
identifying, based on the static analysis, target code in the computer code that is a candidate for attack by an entity that is external to the computer code, the target code being part of repeatable code and corresponding to an entry point into the computer code that is accessible for interaction with the entity;
injecting validation code into the computer code, the validation code to identify, during runtime, a relationship between the part of the computer code and the target code that was not identified by the static analysis by comparing a memory address or derivative thereof associated with the target code to multiple memory addresses associated with different parts of the computer code where memory allocations are established, the relationship establishing that the memory allocation is for the target code, the validation code being injected into the computer code at a location that is outside of the repeatable code containing the target code;
injecting comparing code into the computer code outside of the repeatable code containing the target code, the comparing code to detect that an attack on the target code has occurred based on the relationship between the part of the computer code and the target code, and to set a condition based on the attack on the target code having occurred; and
changing execution of the target code based on the condition.

2. The method of claim 1, wherein identifying the target code comprises determining that the interaction is repeatable.

3. The method of claim 1, wherein the target code provides a way of attacking the computer code, where attacking comprises leveraging the target code to gain control of the computer code, to access or to leak information accessible to the computer code, or to compromise functionality or security of a system executing the computer code.

4. The method of claim 1, wherein the computer code is executable on an embedded system; and
wherein the attack comprises leveraging the target code to affect operation of the embedded system.

5. The method of claim 1, wherein identifying the target code comprises performing the static analysis of the computer code to identify the target code among instructions that reside in loops in the computer code, that operate on induction variables, or that both reside in loops and operate on induction variables.

6. The method of claim 1, wherein the validation code confirms that the target code meets one or more requirements for being a candidate for attack.

7. The method of claim 5, wherein an induction variable corresponds to a register that is only defined once in a loop via a register definition; and
wherein the register definition is linear and invariant.

8. The method of claim 5, wherein an induction variable enables access to contiguous memory.

9. The method of claim 1, wherein the target code comprises a load instruction.

10. The method of claim 1, wherein the target code comprises a store instruction.

11. The method of claim 1, wherein the target code comprises a store multiple instruction or a load multiple instruction.

12. The method of claim 1, wherein execution of the target code based on the condition comprises not executing an instruction.

13. The method of claim 1, wherein execution of the target code based on the condition comprises overwriting an instruction.

14. The method of claim 1, wherein the comparing code is injected to precede the target code in the computer code.

15. The method of claim 1, wherein the comparing code sets the condition based on a comparison of a memory access associated with the target code to a memory boundary for the target code.

16. The method of claim 15, wherein the comparison comprises a boundary check to determine whether the memory access deviates from memory allocation for the target code.

17. The method of claim 15, wherein the comparison comprises a boundary check to determine whether the memory access exceeds memory allocation for the target code.

18. One or more non-transitory machine-readable storage media storing instructions that are executable by one or more processing devices to perform operations comprising:
performing a static analysis of computer code to identify a part of the computer code where a memory allocation is established;
identifying, based on the static analysis, target code in the computer code that is a candidate for attack by an entity that is external to the computer code, the target code being part of repeatable code and corresponding to an entry point into the computer code that is accessible for interaction with the entity;
injecting validation code into the computer code, the validation code to identify, during runtime, a relationship between the part of the computer code and the target code that was not identified by the static analysis by comparing a memory address or derivative thereof associated with target code to multiple memory addresses associated with different parts of the computer code where memory allocations are established, the relationship establishing that the memory allocation is for the target code, the validation code being injected into the computer code at a location that is outside of the repeatable code containing the target code;
injecting comparing code into the computer code outside of the repeatable code containing the target code, the comparing code to detect that an attack on the target code has occurred based on the relationship between the part of the computer code and the target code, and to set a condition based on the attack on the target code having occurred; and
changing execution of the target code based on the condition.

19. The one or more non-transitory machine-readable storage media of claim 18, wherein identifying the target code comprises determining that the interaction is repeatable.

20. The one or more non-transitory machine-readable storage media of claim 18, wherein the target code provides a way of attacking the computer code, where attacking comprises leveraging the target code to gain control of the computer code, to access or to leak information accessible to the computer code, or to compromise functionality or security of a system executing the computer code.

21. The one or more non-transitory machine-readable storage media of claim 18, wherein the computer code is executable on an embedded system; and
wherein the attack comprises leveraging the target code to affect operation of the embedded system.

22. The one or more non-transitory machine-readable storage media of claim 18, wherein identifying the target code comprises performing the static analysis of the computer code to identify the target code among instructions that reside in loops in the computer code, that operate on induction variables, or that both reside in loops and operate on induction variables.

23. The one or more non-transitory machine-readable storage media of claim 18, wherein the validation code confirms that the target code meets one or more requirements for being a candidate for attack.

24. The one or more non-transitory machine-readable storage media of claim 22, wherein an induction variable corresponds to a register that is only defined once in a loop via a register definition; and
wherein the register definition is linear and invariant.

25. The one or more non-transitory machine-readable storage media of claim 22, wherein an induction variable enables access to contiguous memory.

26. The one or more non-transitory machine-readable storage media of claim 18, wherein the target code comprises a load instruction.

27. The one or more non-transitory machine-readable storage media of claim 18, wherein the target code comprises a store instruction.

28. The one or more non-transitory machine-readable storage media of claim 18, wherein the target code comprises a store multiple instruction or a load multiple instruction.

29. The one or more non-transitory machine-readable storage media of claim 18, wherein execution of the target code based on the condition comprises not executing an instruction.

30. The one or more non-transitory machine-readable storage media of claim 18, wherein execution of the target code based on the condition comprises overwriting an instruction.

31. The one or more non-transitory machine-readable storage media of claim 18, wherein the comparing code is injected to precede the target code in the computer code.

32. The one or more non-transitory machine-readable storage media of claim 18, wherein the comparing code sets the condition based on a comparison of a memory access associated with the target code to a memory boundary for the target code.

33. The one or more non-transitory machine-readable storage media of claim 32, wherein the comparison comprises a boundary check to determine whether the memory access deviates from memory allocation associated with the target code.

34. The one or more non-transitory machine-readable storage media of claim 32, wherein the comparison comprises a boundary check to determine whether the memory access exceeds memory allocation associated with the target code.

35. A system comprising:
one or more processing devices; and
memory storing instructions that are executable by the one or more processing devices to perform operations comprising:
  performing a static analysis of computer code to identify a part of the computer code where a memory allocation is established;
  identifying, based on the static analysis, target code in the computer code that is a candidate for attack by an entity that is external to the computer code, the target code being part of repeatable code and corresponding to an entry point into the computer code that is accessible for interaction with the entity;
  injecting validation code into the computer code, the validation code to identify, during runtime, a relationship between the part of the computer code and the target code that was not identified by the static analysis by comparing a memory address or derivative thereof associated with target code to multiple memory addresses associated with different parts of the computer code where memory allocations are established, the relationship establishing that the memory allocation is for the target code, the validation code being injected into the computer code at a location that is outside of the repeatable code containing the target code;
  injecting comparing code into the computer code outside of the repeatable code containing the target code, the comparing code to detect that an attack on the target code has occurred based on the relationship between the part of the computer code and the target code, and to set a condition based on the attack on the target code having occurred; and
  changing execution of the target code based on the condition.

36. The system of claim 35, wherein identifying the target code comprises performing the static analysis of the computer code to identify the target code among instructions that reside in loops in the computer code, that operate on induction variables, or that both reside in loops and operate on induction variables.

37. The system of claim 35, wherein the validation code is for confirming that the target code meets one or more requirements.

38. The system of claim 35, wherein execution of the target code based on the condition comprises not executing an instruction.

39. The system of claim 35, wherein execution of the target code based on the condition comprises overwriting an instruction.

\* \* \* \* \*